July 1, 1941.    J. H. SHARP    2,247,670
POWER TRANSMITTING MEANS
Filed April 17, 1940
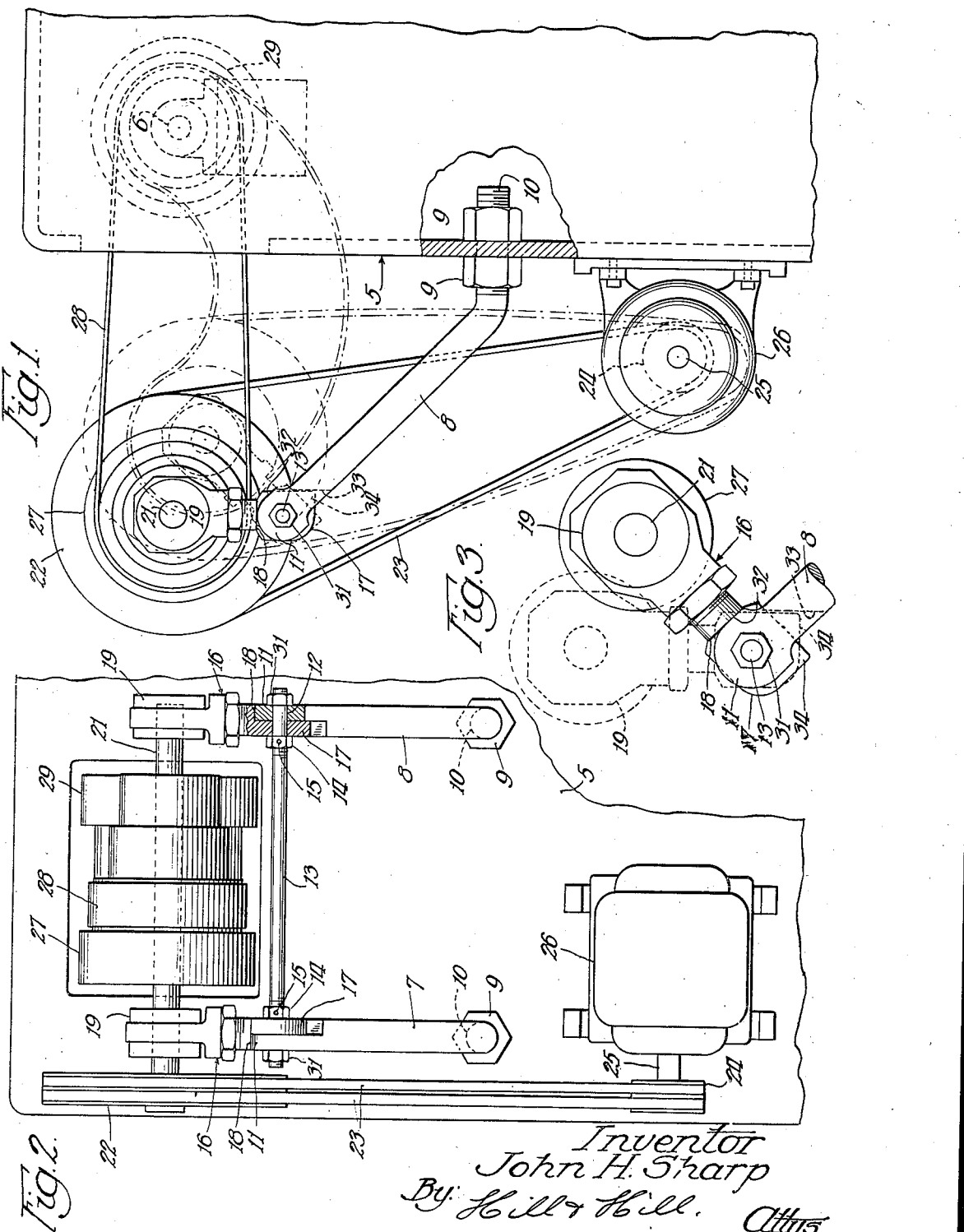
Inventor
John H. Sharp
By Hill & Hill
Attys.

Patented July 1, 1941

2,247,670

UNITED STATES PATENT OFFICE 2,247,670

POWER TRANSMITTING MEANS

John H. Sharp, Chicago, Ill.

Application April 17, 1940, Serial No. 330,079

2 Claims. (Cl. 74—242.15)

This invention relates to power transmitting means, and is particularly adaptable for use in connection with machines wherein power is derived from substantially constant-speed driveshaft, and wherein it is frequently found desirable to change the speed of a driven shaft associated with the machine.

Heretofore, it has been customary to use pivoted motor mountings in connection with ordinary change-speed devices, necessitating special parts for machines of different types and sizes to accomplish the desired purpose. Likewise, each particular motor size and setup required individually designed mountings. In the present construction, only one sized device is needed, the parts thereof being interchangeable with the corresponding parts of other similar devices, regardless of the particular machine or machines with which a device is used.

One object, therefore, of the present invention is to provide a device of the kind described, which is universal in character in that it may be utilized on various types and sizes of machines with little alteration, the parts of devices being interchangeable with one another regardless of the particular types or sizes of the machines on which the devices may be used.

Another object of the invention is to provide a device of novel construction and arrangement wherein the changing of speed and operation of a driven shaft may be readily accomplished and controlled.

Another object of the invention is to provide novel means whereby belt connected shafts having step or cone pulleys thereon may be moved relatively to each other to shorten the distance between the centers of the respective shafts, and permit the shifting of the belt from one position to another of the respective pulleys.

A further object of the invention is to provide a device occupying a minimum of space, of improved appearance, economical to manufacture, of simple construction, and efficient in its operation.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a side elevational view of my improved machine driving means illustrating the manner of mounting the same on a machine frame;

Fig. 2 is a rear elevational view of the structure illustrated in Fig. 1; and

Fig. 3 is an enlarged fragmentary elevational view of a portion of the structure illustrated in Fig. 1.

In the drawing, 5 designates a portion of a machine frame, such, for example, as a lathe, milling machine, or other types of machines, to which the present invention may be applied, and wherein a driven machine shaft 6 is rotatably mounted and intended to be driven at various speeds depending upon the character of work handled by the machine.

The illustrative embodiment of the present invention includes a bracket-like bearing support shown, in the present instance, as comprising a pair of bracket-rods indicated, as a whole and respectively, by the numerals 7 and 8, rigidly secured to the frame 5 by means shown, in the present instance, as nuts 9 mounted on the threaded end portions 10 of the bracket-rods 7 and 8, and positioned at opposite sides of portions of the frame 5.

The bracket-rods 7 and 8 extend upwardly and rearwardly from their connection with the machine frame 5 to an elevation adjacent the horizontal plane of the shaft 6 and are provided adjacent their outer ends with portions 11 of reduced thickness having apertures 12 formed therein and adapted to receive the respective screwthreaded end portions of a spacing rod 13 having stop members 14 mounted thereon for properly spacing the upper end portions of the brackets 7 and 8 with respect to each other, the stop members being shown, in the present instance, as a pair of threaded nuts adjustably mounted on the threaded portion of the rod 13 and adapted to be secured thereto by means of pins 15 when the stop members have been placed in proper adjusted position.

Pivotally mounted on the rod 13 adjacent the spaced brackets 7 and 8 are upwardly extending supporting members or arms indicated, as a whole, by the numeral 16 and provided adjacent their lower ends with portions 17 of reduced thickness surrounding the rod 13 and providing shoulders 18 adapted to overlie the outer end portions 11 of the bracket-rods 7 and 8.

Mounted in the upper end portions of the supporting members 16 are bearings 19 adapted to receive the outer end portions of a counter-shaft 21 in a manner to rotate therein, the countershaft being provided adjacent one of its end portions with a pulley 22 operatively connected by belts 23 to a pulley 24 mounted on a driving shaft 25 of a motor 26 mounted on the frame 5 of the machine.

Mounted also on the counter-shaft 21 in a manner to rotate therewith is a step pulley 27 operatively connected by a belt 28 to a step pulley 29 mounted on the machine shaft 6 in a manner to rotate the shaft 6 at various speeds depending upon the portions of the step pulleys 27 and 29 on which the belt 28 is mounted.

For securing the supporting members 16 and the counter-shaft 21 and pulleys mounted thereon in relatively fixed and operative position with respect to the shaft 6 and step pulley 29 mounted thereon, the rod 13 is provided adjacent its outer end portions with nuts 31 by which the upper end portions of the brackets 7 and 8 and the portions 17 of the arm 16 may be securely clamped against the stops 14, thereby securing the step pulley 27 in operative position with respect to the step pulley 29 after the belt 28 has been shifted to the desired or proper position thereon.

It will be observed by such an arrangement, that by loosening the nuts 31 slightly, the arms 16 and counter-shaft 21 with the step pulley 27 mounted thereon may be shifted to the dotted line position shown in Fig. 1 and the full line position shown in Fig. 3, thereby producing a slack in the belt 28 to permit shifting of the belt on the step pulleys 27 and 29, after which the arms 16, counter-shaft 21 and step pulley 27 mounted thereon may be returned to their normal position shown by full lines in Fig. 1 and by dotted lines in Fig. 3, thereby tightening the belt 28 to insure efficient operation of the driving connection between the counter-shaft 21 and machine shaft 6.

For limiting the movement of the arms 16 in the direction of the machine frame, the outer end portions of the brackets 7 and 8 are each provided with a flat side 32 adapted to be engaged by the shoulder 18 formed by the offset portion of the arm 16 as shown in Fig. 3, and to limit the movement of the arms 16 in the opposite direction, the cut-away portion of the brackets 7 and 8 provides a stop face 33 adapted to be engaged by a lug 34 formed adjacent the lower end portion of the arms 16, as clearly illustrated in Fig. 3.

It will be observed from the foregoing description that the present invention provides a novel device of the kind described, which is universal in character and may be employed on various types and sizes of machines with little alteration, the parts of devices being interchangeable with one another regardless of the particular types and sizes of the machines on which the devices may be used.

It will be observed, also, that the present invention provides a device of novel construction and arrangement wherein the changing of speed and operation of a machine shaft 6 may be readily controlled, and wherein the counter-shaft 21 may be readily and conveniently shifted to shorten the distance between the centers of the counter-shaft and machine shaft to permit shifting of the belt 28 from one portion of the step pulleys 27 and 29 to other portions thereof.

Also, the present invention provides a device occupying a minimum of space, of improved appearance, economical to manufacture, of simple construction, and efficient in its operation.

Obviously, the present invention is not limited to the precise arrangement and construction shown and described as the same may be variously modified without departing from the spirit and scope of the invention, as set forth in the appended claims.

What I claim as new and desire to secure by Letters Patent is:

1. In a device of the class described and in combination, a frame, a driving shaft and a driven shaft mounted thereon, spaced brackets mounted on said frame, said brackets having apertures therein, a rod mounted in said apertures, supporting members pivotally mounted on said rod adjacent each bracket, a counter-shaft rotatably mounted in said members, pulleys on the respective shafts, belts operatively related to said pulleys, spacing means on said rod for retaining the upper end portions of said brackets in relatively fixed relationship, and releasable means on said rod and cooperable with said spacing means for securing said members in fixed position with respect to said brackets.

2. In a device of the class described and in combination, a frame, a driving shaft and a driven shaft mounted thereon, spaced brackets mounted on said frame, said brackets having apertures therein, a rod mounted in said apertures, a pair of spaced shaft supporting members pivotally mounted on said rod adjacent the respective ends thereof, a counter-shaft rotatable in said members, pulleys on the respective shafts, belts operatively related to said pulleys, spacing means on said rod for retaining the upper end portions of said brackets in relatively fixed, spaced relationship, releasable means on said rod and cooperable with said spacing means for securing said members in fixed position with respect to said brackets, and means on said brackets for limiting the movement of said supporting members with respect thereto.

JOHN H. SHARP.